Jan. 1, 1924
M. J. McANENY
1,479,307
AIR PRESSURE CONTROLLER FOR INFLATING PNEUMATIC TIRES
Filed Oct. 18, 1922
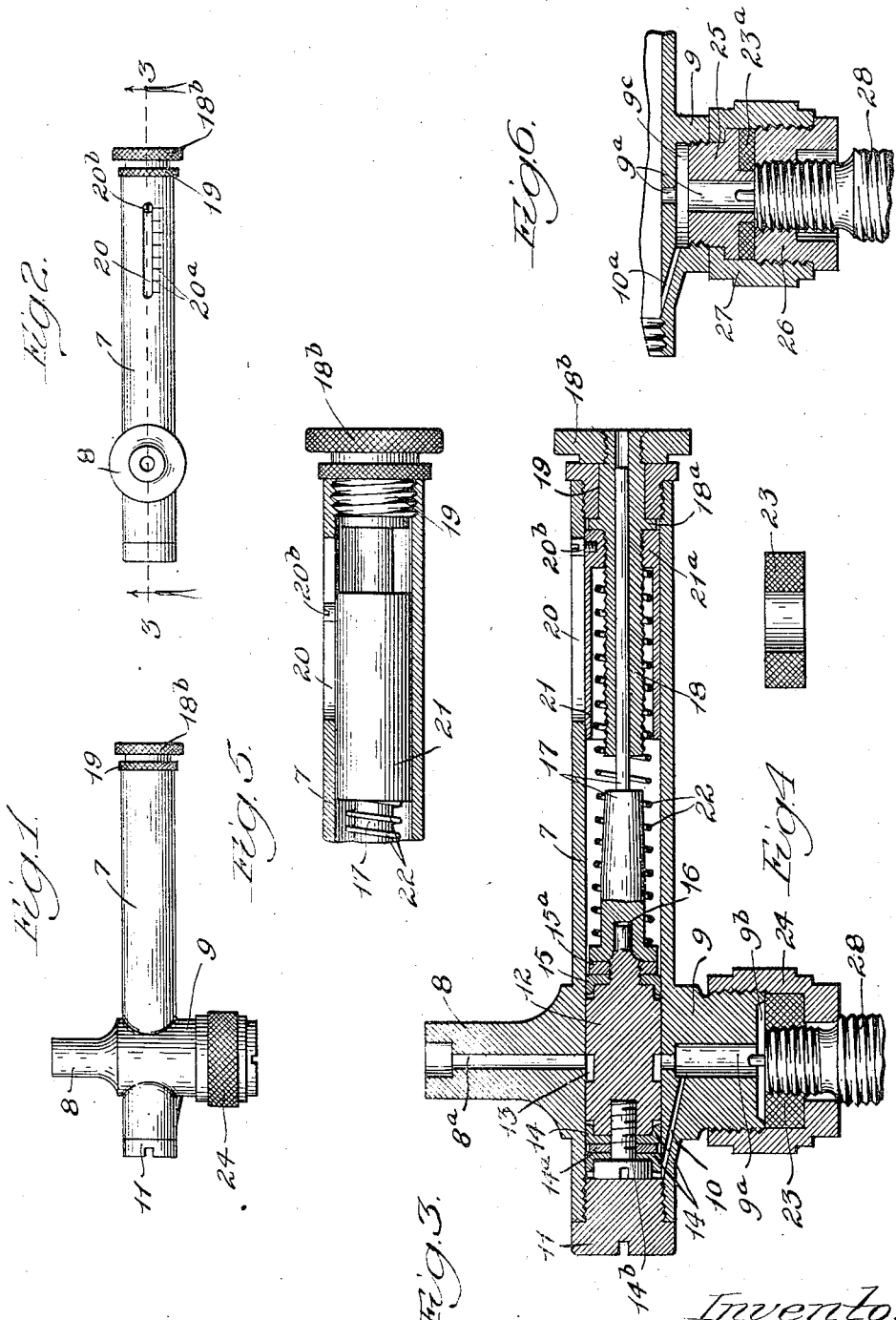
Inventor:
Michael J. McAneny,
By Dyrenforth, Lee, Chritton & Wiles,
Attys.

Patented Jan. 1, 1924.                                    1,479,307

UNITED STATES PATENT OFFICE.

MICHAEL J. McANENY, OF DENVER, COLORADO.

AIR-PRESSURE CONTROLLER FOR INFLATING PNEUMATIC TIRES.

Application filed October 18, 1922. Serial No. 595,334.

*To all whom it may concern:*

Be it known that I, MICHAEL J. McANENY, a citizen of the United States, residing at Denver, in the county of Denver and State of Colorado, have invented a new and useful Improvement in Air-Pressure Controllers for Inflating Pneumatic Tires, of which the following is a specification.

My invention is a device for use in inflating pneumatic tires to control the amount of air-pressure being introduced therein and indicate the same to the operator; and it is fully described in the specification and illustrated in the accompanying drawing, in which—

Figure 1 shows the device by a view in side elevation;

Figure 2 is a plan view of the same;

Figure 3 is an enlarged sectional view on line 3—3, Fig. 2;

Figure 4 is a vertical sectional view of the compressible and expansible gasket detail in Fig. 3;

Figure 5 is an enlarged longitudinal section showing parts in elevation of the end portion of the device containing the pressure-indicating mechanism, and representing it in a position different from that represented in Fig. 3; and Figure 6 is a sectional view illustrating a modification of the nozzle-portion of the device shown in Fig. 3.

A tubular valve-casing 7 is provided on diametrically-opposite sides near its forward end respectively with a nipple 8 containing an air-duct $8^a$, and a nozzle 9 containing an air-duct $9^a$ alining with the duct $8^a$; and a by-press or bleeder-duct 10 (Fig. 3) leads from the duct $9^a$ into the forward end of the casing, which is shown to be closed by a screw-plug 11. In the casing is a piston-valve 12 having a circumferential duct 13 to normally register with the ducts $8^a$ and $9^a$, but of greater width than the mouth of either of the latter. The piston-valve is shown to be packed at its outer end by cups 14, preferably of leather, and an interposed washer $14^a$, secured in place by a screw $14^b$, and at its opposite, reduced and threaded end by a cup 15 and nut $15^a$. A tongue on the inner extremity of the valve enters a socket 16 in the forward flanged and relatively enlarged section of the valve-stem 17, the reduced section of which passes through a hollow screw 18 provided with a flange $18^a$, against the outer face of which a flanged nut 19 is screwed and bears at its flange against the rear end of the casing 7. The outer end of the screw 18 carries a knurled button-like handle $18^b$ by which to turn it for the purpose hereinafter explained. The casing contains in its rear-end portion a longitudinal slot 20 having a series of gage-marks $20^a$ along one side at uniform intervals apart to indicate degrees of pressure; and within the casing a sleeve 21 surrounding the screw 18 terminates at its outer end in a nut $21^a$ engaging the thread of the screw and bearing against the forward face of its flange $18^a$, which limits its rearward longitudinal movement, the nut 19 preventing longitudinal movement of the rotatable screw 18, and the head of a pointer $20^b$ projecting from the sleeve-nut $21^a$ into the slot 20 to work therein, preventing rotatory movement of the sleeve. A helical spring 22 extends in the casing about the valve-stem and within the sleeve 21 about the screw 18, being endwise confined between a flange on the forward end of the valve-stem and the nut forming rear end of the sleeve 21.

The nozzle 9 shown in Fig. 3 has its face dished at $9^b$ to form with a gasket 23 of yielding material, preferably rubber, an air-chamber or expansion of the duct $9^a$ to extend over the gasket, which is confined against the face of the nozzle by a knurled thimble 24 screwing about the externally-threaded surface thereof. At 28 is represented the nipple-end of the usual valved tube of a pneumatic tire (not shown) to which the nozzle is applied for inflating the tire as hereinafter described; and the air-pressure entering the chamber $9^b$ through the duct $9^a$ so compresses the confined gasket 23 as to cause it to hug the tube for preventing leakage about the latter in the inflating operation.

The modified construction of the nozzle illustrated in Fig. 6 is more particularly designed for use in inflating bicycle-tires, while the construction thereof shown in Fig. 3 is more particularly designed for use in inflating automobile-tires. In Fig. 6 the lower and larger section of the duct $9^a$ extends centrally through a flanged and threaded plug 25, and an expansion $9^c$ of the duct is formed between the aforesaid sections thereof, a branch or bleeder duct $10^a$ leading from the expansion $9^c$ into the casing 7 as the corresponding duct 10 of Fig. 3 leads and for the same purpose. A rubber gasket 23ª surrounds the outer end of the plug 25 in an annular recess thereabout, and an internally and externally threaded hollow plug 26 screws into an internally threaded knurled collar 27 rotatably confined about the plug 25, and bears against the gasket 23ª to confine it in place, whereby the plug 26 shown in Fig. 6 may, by rotating the collar, be screwed upon the tire-nipple 28.

The primary purpose of my device is to enable by its use excessive inflation of a tire, and resultant danger of thereby bursting it to be avoided; and the purpose of the pressure-controlling mechanism is to permit the spring 22 to be set, to prevent more than a predetermined degree of air-pressure from entering a tire undergoing inflation which pressure may be thirty pounds to the square inch for each inch in diameter for the inner tubes of automobile tires, and twenty for bicycle tires. The degrees indicated on the scale may denote a progression of 10-pound intervals, thus up to 80 pounds on the scale illustrated, or higher if desired.

With the nipple 8 attached to a hose (not shown, but leading from a source of air-pressure, also not shown), to inflate a tire the nozzle 9 is applied to the tire-nipple. According to the maximum pressure that is to be introduced into the tire for inflating it, the spring 22 is preparatorily set. If the predetermined pressure be, say, 60 pounds the button 18ᵇ is turned in the clockwise direction to rotate the screw 18 and thereby advance the sleeve 21 and with it the pointer 20ᵇ until the latter registers with that number on the scale, which as shown in Fig. 1 is not but may be understood to be numbered from 10 to 80, the numbers increasing in the direction from left to right in Fig. 2. In the showing in Fig. 5, the pointer may, for the purpose of the present explanation, be regarded as undergoing advancement toward the number 60 on the scale, indicating the maximum air-pressure which my device will admit into the tire. Thus advancing the sleeve compresses the spring 22 to so increase its tension that back-pressure against it of the piston-valve 12, produced as hereinafter described, will not further compress it when the tire has been inflated to the predetermined degree. The nozzle being applied as stated, air from the source of supply, the pressure of which may be 100 pounds, more or less, to the square inch, passes through the nipple-duct 8ª, circumferential duct 13 about the valve and nozzle-duct 9ª, opens the valve in the tire-nipple 28 and enters the tire. The tire, however, will not take the entire flow through the ducts, and the excess bleeds through the duct 10 (or 10ª as the case may be) into the casing 7 and forces the valve 12 against the spring 22, thereby gradually decreasing the registering width of the duct 13 with the ducts 8ª and 9ª. The continued excess of pressure bleeding into the casing continues to force the piston-valve in the backward direction until the duct 13 is out of registration with the ducts 8ª and 9ª, whereby the air-pressure supply is cut off and the spring has been subjected to its maximum of compression under the air-pressure exerted against the valve, which will have protruded the rear end of the valve-stem through the button 18ᵇ to inform the operator that the tire has been inflated to the predetermined degree.

Upon withdrawing the device from the tire-nipple 28 the air-pressure against the valve exhausts through the ducts 10 and 9ª, permitting the spring to recoil and force the valve into its initial position, wherein the duct 13 is in full communication with the ducts 8ª and 9ª. The pointer 20ᵇ may remain in any position to which it is set for setting the valve-spring for inflating tires of the same inflation capacity, and it may be set to any other desired pressure-indication on the scale by properly turning the button 18ᵇ to advance or retract the sleeve 21 for effecting automatic cutting off in the manner described of the air-pressure supply upon predetermined completion of the tire-inflation.

I realize that considerable variation is possible in the details of construction herein shown, and I do not intend to limit myself thereto except as pointed out in the appended claims, in which it is my intention to claim all the novelty inherent in the device as broadly as is permitted by the state of the art.

I claim:

1. A device for controlling the admission of air-pressure into a pneumatic tire undergoing inflation, comprising a tubular valve-casing provided with pressure inlet and outlet-ducts, a spring-pressed valve in the casing having a stem and an air-duct normally registering with said ducts, a duct connecting said outlet-duct with the casing in advance of the valve therein, a sleeve in the casing reciprocably confined against the valve-spring therein and provided with a nut, a hollow screw extending through the sleeve in engagement with the nut and confined against longitudinal movement and lengthwise through which the valve-stem works, and means for turning the screw to adjust the tension of the valve-spring.

2. A device for controlling the admission of air-pressure into a pneumatic tire undergoing inflation, comprising a tubular valve-casing provided with pressure inlet and outlet-ducts, a spring-pressed valve in the casing having a stem and an air-duct normally registering with said ducts, a duct connecting said outlet-duct with the casing in advance of the valve therein, a sleeve reciprocably confined in the casing and provided with a nut confining the valve-spring at its rear end, a hollow screw extending through the sleeve in engagement with the nut and confined against longitudinal movement and lengthwise through which the valve-stem works, and a handle at the rear-casing-end on the screw for turning it to adjust the tension of the valve-spring.

3. A device for controlling the admission of air-pressure into a pneumatic tire undergoing inflation, comprising a tubular valve-casing closed at its forward end and having a longitudinal slot toward its rear end provided with gage-marks, a nipple and a nozzle extending opposite each other from the casing transversely thereof toward its forward end and containing, respectively, a pressure-inlet duct and a pressure-outlet duct, a spring-pressed valve in the casing having a stem and provided with a duct normally registering with said inlet and outlet ducts, a duct in the nozzle leading from said outlet-duct into the casing in advance of said valve, a sleeve reciprocably confined in the casing against the valve-spring, carrying a pointer projecting into said slot and provided with a nut, a hollow screw extending through the sleeve in engagement with the nut and confined against longitudinal movement and lengthwise through which the valve-stem works, and means on the screw for turning it to adjust the tension of the valve-spring.

4. A device for controlling the admission of air-pressure into a pneumatic tire undergoing inflation, comprising a tubular valve-casing provided with a nipple containing an inlet-duct, a nozzle containing an outlet-duct and an elongated gage-slot, a piston-valve in the casing having a stem and an air-duct normally registering with said nipple and nozzle ducts, a duct in the nozzle connecting the duct therein with the casing in advance of the valve, a valve-stem extending from the valve lengthwise through the casing, a hollow screw rotatably confined in the casing against longitudinal movement and carrying an operating handle on its outer end through which the valve-stem extends, a sleeve having an end-nut and surrounding said screw with the nut engaging therewith, a pointer projecting from the sleeve into said gage-slot, and a helical spring endwise confined about the valve-stem and extending into the sleeve about the screw and against said nut.

MICHAEL J. McANENY.